United States Patent [19]

Orrell et al.

[11] Patent Number: 4,720,897
[45] Date of Patent: Jan. 26, 1988

[54] AUTOMATIC FASTENING MACHINE WITH BRUSHLESS ELECTRIC MOTOR FOR DRILL SPINDLE DRIVE

[75] Inventors: William E. Orrell, West Seneca; Mark J. Andrews, Niagara Falls, both of N.Y.

[73] Assignee: Gemcor Engineering Corp., Buffalo, N.Y.

[21] Appl. No.: 771,368

[22] Filed: Aug. 30, 1985

[51] Int. Cl.[4] .................... B23P 23/02; B23B 47/06
[52] U.S. Cl. .................................... 29/26 A; 408/9; 408/124; 409/193; 409/231
[58] Field of Search ............ 408/8, 9, 16, 124; 409/231, 134, 135, 136, 232, 193; 29/26 A; 318/571, 711, 603

[56] References Cited

U.S. PATENT DOCUMENTS

| | | | |
|---|---|---|---|
| 2,488,645 | 11/1949 | Speller et al. | 29/26 A |
| 2,956,344 | 10/1960 | Rantsch | 408/16 X |
| 3,405,338 | 10/1968 | Frola | 318/711 X |
| 3,521,526 | 7/1970 | Olig et al. | 409/135 |
| 3,703,846 | 11/1972 | Krafft | 409/232 |
| 4,004,204 | 1/1977 | Hoves et al. | 318/571 X |
| 4,350,941 | 9/1982 | McClure et al. | 318/603 |
| 4,514,123 | 4/1985 | Johnstone et al. | 409/231 |
| 4,519,734 | 5/1985 | Mitchell | 409/231 |
| 4,534,686 | 8/1985 | Nakamura et al. | 409/231 X |
| 4,580,471 | 4/1986 | Oyama et al. | 409/232 X |

Primary Examiner—Gil Weidenfeld
Assistant Examiner—Glenn L. Webb
Attorney, Agent, or Firm—Christel, Bean & Linihan

[57] ABSTRACT

In an automatic fastening machine comprising a frame, drilling assembly carried by the frame for drilling a fastener receiving hole in a workpiece and an arrangement carried by the frame for installing a fastener in the hole drilled in the workpiece, the drilling assembly comprising a drill spindle having an axis of rotation and a drilling tool at one end thereof and rotatably mounted in a ram movable on the machine frame toward and away from the workpiece, the improvement of a brushless synchronous a.c. servomotor including an output shaft having an axis of rotation and an arrangement for connecting the motor directly to the drill spindle with the axis of rotation of the motor shaft coincident with the axis of rotation of the drill spindle. There is also provided a fan on the frame and positioned to direct cooling air onto the motor. There is further provided a heat sensor embedded in the motor winding and a readout operatively connected to the heat sensor for providing an indication of motor winding temperature.

14 Claims, 8 Drawing Figures

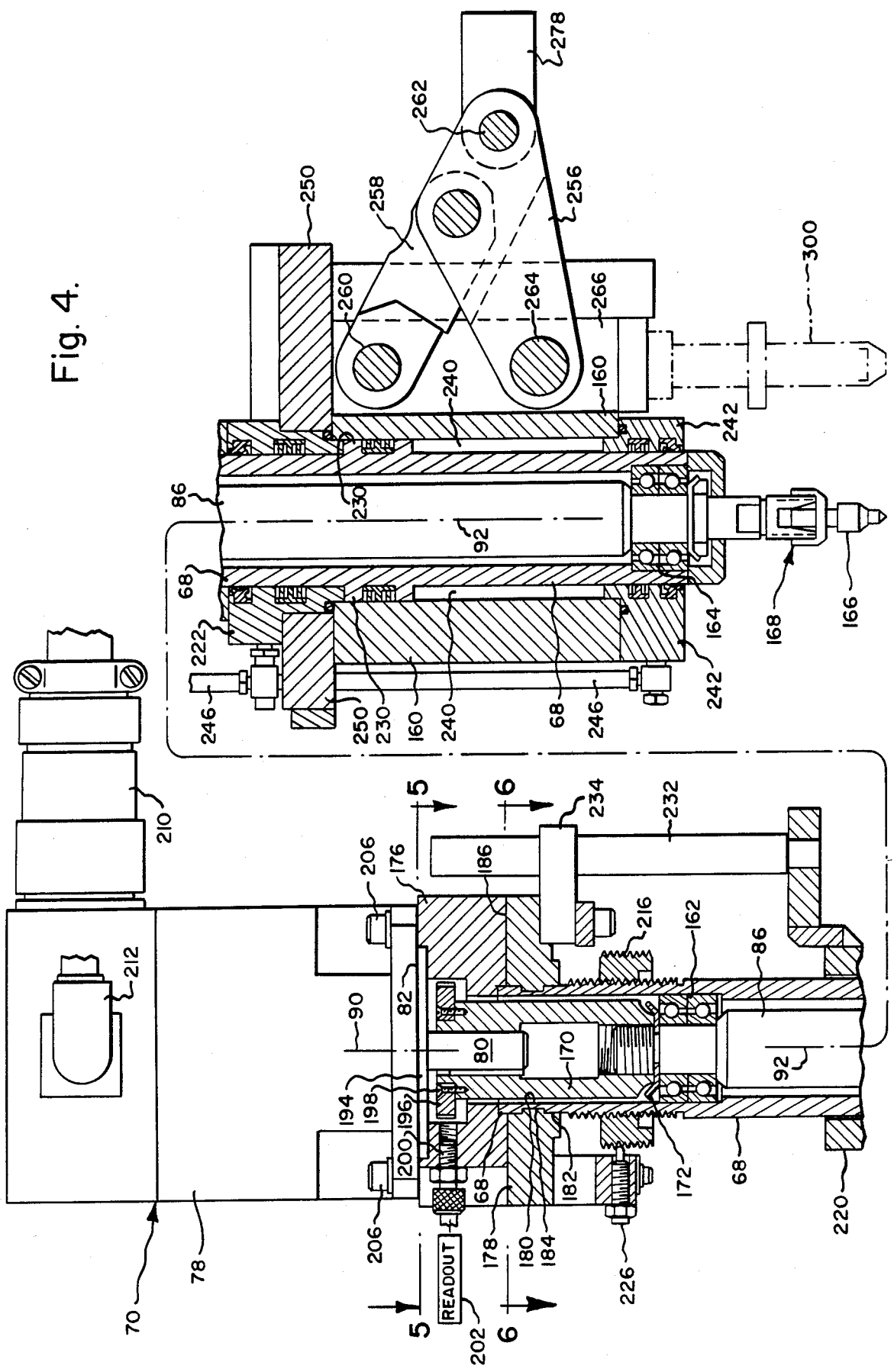

AUTOMATIC FASTENING MACHINE WITH BRUSHLESS ELECTRIC MOTOR FOR DRILL SPINDLE DRIVE

BACKGROUND OF THE INVENTION

This invention relates to the art of automatic fastening machines, and more particularly to a new and improved drill spindle drive for such machines.

One area of use of the present invention is in automatic drilling and riveting machines, although the principles of the present invention can be variously applied to other automatic fastening machines. In drilling holes in certain metals for insertion of rivets or other fasteners, it is necessary to drive the drill at low speed and with high torque. Electric motors have a number of advantages in terms of lower energy requirements, fewer maintenance problems and quieter operation. Therefore it would be highly desirable to provide a new and improved drill spindle drive for automatic fastening machines employing an electric drive motor and having low speed controllability and high torque.

SUMMARY OF THE INVENTION

It is, therefore, a primary object of this invention to provide a new and improved drill spindle drive for automatic fastening machines.

It is a further object of this invention to provide such a drill spindle drive employing an electric motor in a direct drive configuration.

It is a further object of this invention to provide such a drill spindle drive employing an electric motor in a direct drive configuration and having low speed controllability and high torque.

It is a further object of this invention to provide such a drill spindle drive which is efficient in operation and convenient to maintain.

The present invention provides in an automatic fastening machine comprising a frame, drilling means carried by the frame for drilling a fastener receiving hole in a workpiece and means carried by the frame for installing a fastener in the hole drilled in the workpiece, the drilling means comprising a drill spindle having an axis of rotation and a drilling tool at one end thereof and rotatably mounted in a ram movable on the machine frame toward and away from the workpiece, the improvement of a brushless synchronous a.c. servomotor including an output shaft having an axis of rotation and means for connecting the motor directly to the drill spindle with the axis of rotation of the motor shaft coincident with the axis of rotation of the drill spindle. There is also provided fan means on the frame and positioned to direct cooling air onto the motor. There is further provided heat sensor means embedded in the motor winding and readout means operatively connected to the heat sensor means for providing an indication of motor winding temperature.

The foregoing and additional advantages and characterizing features of the present invention will become clearly apparent upon a reading of the ensuring detailed description together with the included drawing wherein:

BRIEF DESCRIPTION OF THE DRAWING FIGURES

FIG. 4 is an enlarged, fragmentary longitudinal sectional view of the drill spindle drive according to the present invention in the machine of FIG. 1;

DETAILED DESCRIPTION OF THE ILLUSTRATED EMBODIMENT

Figure 1:
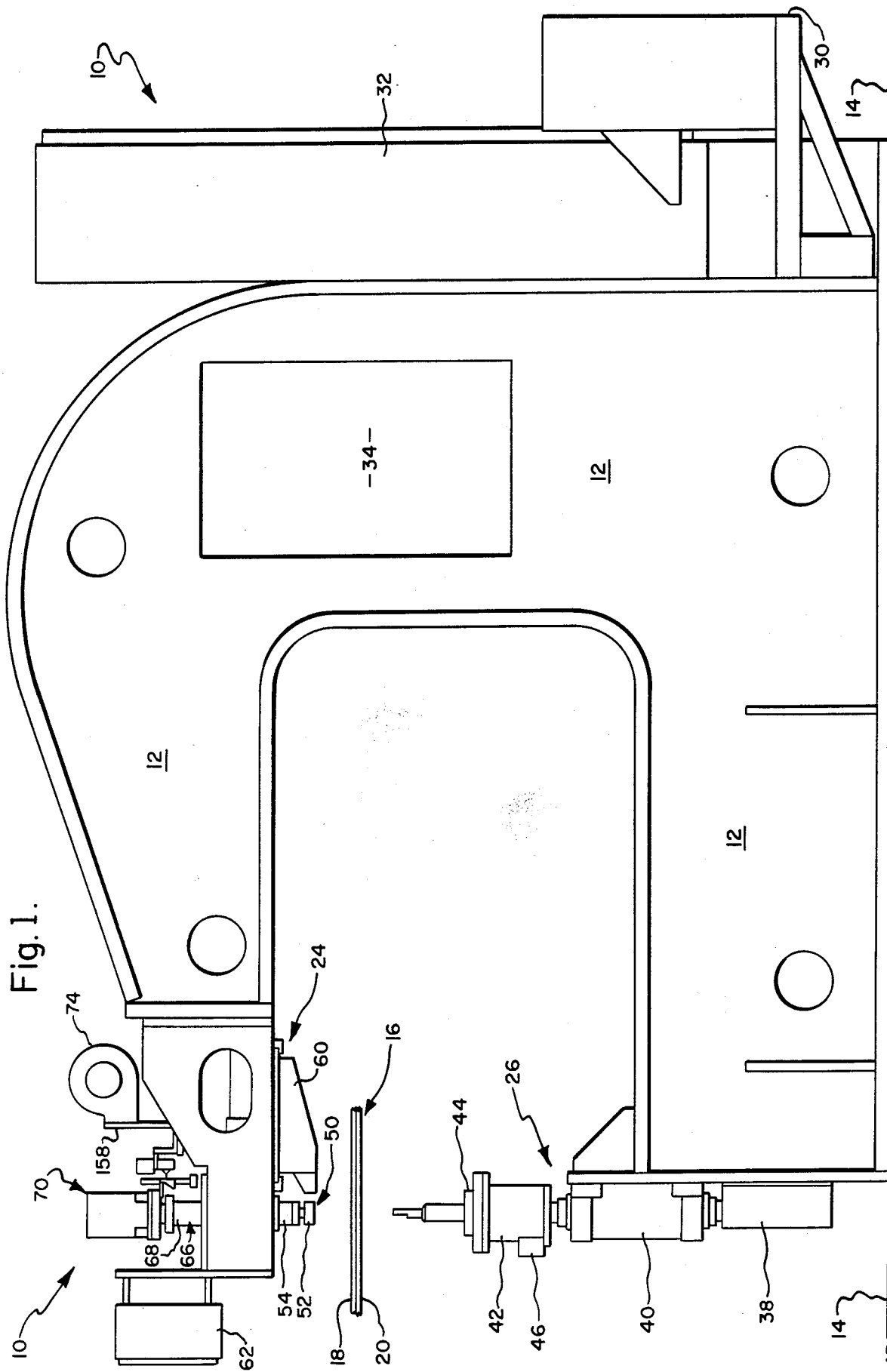
FIG. 1 is a side elevational view of an automatic fastening machine provided with the drill spindle drive according to the present invention.

FIG. 1 shows an automatic fastening machine to which the present invention is applicable and it is in the form of an automatic drilling and riveting machine generally designated 10. Machine 10 includes a generally C-shaped frame 12 supported on a surface 14, such as the floor of a factory. Briefly, a workpiece 16 comprising two metal parts 18, 20 to be joined is introduced into the C-shaped jaws of the machine 10 and clamped together by pneumatic and hydraulic pressure. The parts 18,20 are drilled while clamped, assuring exact hole alignment and eliminating burr formation on inside surfaces. An air cylinder or other suitable motive means shuttles the drill out of position and centers a rivet insertion device over the hole. A rivet is inserted and squeezed or upset by hydraulic pressure applied from below. The machine cycle can be completed very quickly and all functions can be precisely controlled.

In particular, machine 10 of FIG. 1 includes an upper head installation 24 and a lower head assembly 26 both carried by frame 12. Both upper and lower heads 24 and 26, respectively, are mounted on frame 12 so that a vertical alignment is maintained between their respective tooling, i.e. a lower anvil 28 and upper head drill (not shown) and bucking anvil (not shown) are aligned upon a work centerline or drilling and riveting axis. Platform 30 is part of an hydraulic pumping assembly on the opposite end of the frame 12, and electrical controls are located within a housing 32 on frame 12 adjacent platform 30. Hydraulic controls are located on a panel 34 mounted on the web or central vertical section of frame 12. Pneumatic controls are located on a panel (not shown) at a corresponding location on the opposite side of frame 12.

The lower head assembly 26 includes an upset cylinder 38, and a lower ram 40, combined to form a tandem cylinder, a clamp cylinder 42, a turntable 44 and the lower anvil 28. Operation of the assembly is monitored by a clamp and safety limit switch 46 on clamp cylinder 42. The ram 40 is free to reciprocate vertically within a cylindrical cavity. Cylinder 40 moves ram 39 as necessary to perform the upsetting operations. The turntable assembly 44 to which the lower anvil 28 attaches mounts on ram 40.

Figure 3:
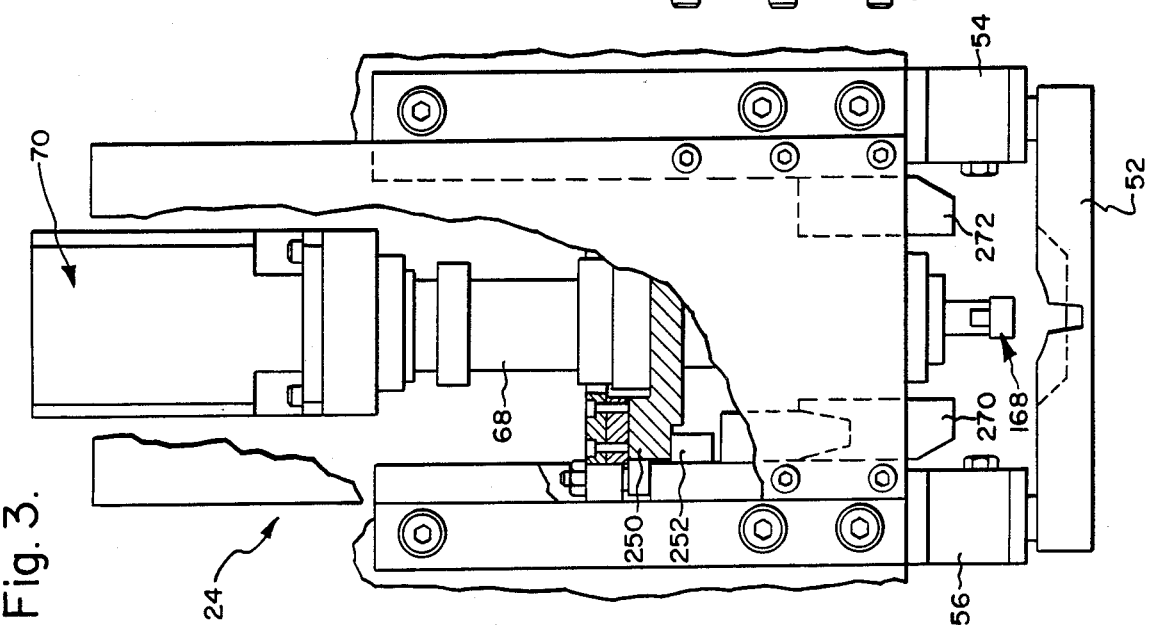
FIG. 3 is an end elevational view taken from the left in FIG. 2.

The upper head installation 24 includes a pressure foot assembly generally designated 50 which is the upper member of the clamping arrangement of machine 10. The workpiece 16 is clamped up against the lower surface of a pressure foot bushing (not shown in FIG. 1) depending from a pressure foot plate 52 of the assembly 50 by pressure from the lower ram assembly 40. The pressure foot assembly 50 includes a pair of pneumatic cylinders, one of which is designated 54 in FIG. 1 and the other 56 in FIG. 3, for providing rigid clamping pressure on the upper surface of workpiece 16 during the drilling/countersinking operation and resilient pressure during upset to prevent dimpling of the workpiece. The upper head installation 24 also includes a hopper 60 for holding each rivet prior to insertion in the hole drilled in the workpiece and a panel 62 containing various controls for machine 10.

The upper head installation further includes a drill spindle assembly generally designated 66 for drilling the rivet receiving hole in the workpiece, an upper anvil and rivet fingers (not shown in FIG. 1) for inserting a rivet in the hole, and a bucking ram (not shown in FIG. 1) for bucking the rivet head while upset pressure is applied from below. The drill spindle assembly 66 includes a drill ram 68 movable linearly toward and away from workpiece 16. The drill spindle (not shown in FIG. 1) is rotatably mounted in ram 68 and is provided with a drilling tool on the end facing workpiece 16.

In accordance with the present invention, there is provided an electric motor 70 in a direct drive configuration with the drill spindle. Motor 70 is carried by ram 68 and the output shaft of motor 70 is directly connected to the drill spindle such that the respective axes of rotation of the motor output shaft and drill spindle are coincident. Also in accordance with the present invention there is provided fan means 74 on machine frame 12 and positioned to direct cooling air onto motor 70 during operation machine 10.

In automatic drilling and riveting machines previously available, hydraulic piston motors typically were used to drive the drill spindle. For example, such hydraulic motors generate about 50-60 inch pounds at 500-6000 r.p.m. and yet weigh only about six pounds and can be mounted on the drill spindle in a direct drive configuration. However, like any hydraulic system, such motor requires filter changes and other periodic maintenance and can occasionally leak hydraulic oil onto the parts to be riveted thereby causing a contamination problem. In particular, hydraulic motors are inherently complicated including a number of parts which are subject to breakdown and wear. They are very sensitive to polluted oil and therefore require filtration equipment. In addition, hydraulic motors operating drills in automatic drilling machines can consume large quantities of oil and require pumping systems which are quite large in relation to the size of the motor. Thus, while hydraulic fluid is needed for operating other motors on such automatic drilling and riveting machines, heretofore most of such fluid has been used for operating the drill motor. The fact that hydraulic motors occasionally can leak oil poses a serious problem in some aircraft riveting applications where the specifications do not allow any oil drop contamination on the aircraft skins. Furthermore, it is difficult to operate hydraulic motors at the low speeds and high torques required in drilling certain metals such as titanium without equipping the motor with complicated and expensive servo valving arrangements.

The use of a compressed air motor for drill spindle devices is limited by relatively high pumping costs and difficulty in providing good quality, pure air for operation of such motors. In addition, compressed air motors do not operate well at the low speeds required in drilling certain metals such as titanium.

In the past, electric motors capable of providing the required torque were far too large and heavy to mount on the movable drill spindle in riveting machines, and therefore it was necessary to employ belts, pulleys scheaves or gearing. Furthermore, the variable torque and speed requirements and variable duty cycle of automatic drilling and riveting machines have limited the use of available electric motors in the past.

In accordance with the present invention, the problem in providing a new and improved electric motor drill spindle drive for automatic fastening machines is determined and defined in the following manner. The electric motor should be employed in a direct drive configuration with respect to the drill spindle. It should have a torque range of 40-60 lb.-in. or better and a speed range of 200-5000 r.p.m. or better. It should have a low profile and small size, i.e. a maximum length of about 6 inches and a maximum diameter of about 4 inches, and it should be relatively light in weight, i.e. a maximum weight of about 10 pounds. The motor should be compatible with state-of-the-art controls and provide smooth, controllable low speed operation. It should provide higher torque with lower maintenance requirements as compared to electric motors used in the past for drill spindle drives.

In accordance with the present invention, there is provided a new and improved drill spindle drive for automatic fastening machines characterized by a brushless synchronous a.c. servomotor directly connected to the drill spindle with the axis of rotation of the motor shaft coincident with the the drill spindle drive according to the present invention, the brushless synchronous a.c. servomotor 70 has a generally rectangular housing 78, and the motor output shaft 80 extends from a planar surface 82 of housing 78. Motor 70 is mounted on the upper end of drill ram 68 as viewed in FIG. 4 and is carried by ram 68 during movement of ram 68 toward and away from the workpiece during drilling. As shown in FIG. 4, the output shaft 80 of motor 70 is directly connected to the drill spindle 86 which is rotatably mounted in ram 68 with the axis of rotation 90 of motor shaft 80 coincident with the axis of rotation 92 of drill spindle 86. The structure and operation of the arrangement of FIG. 4 will be described in further detail presently.

Motor 70 is a small, light-weight, high-torque servomotor with complete position resolving capability built in as will be described. The motor 70 is small enough in size and light enough in weight for direct drive mounting on the drill spindle 86 and drill ram 68. Of particular interest for use in drill spindle drive for automatic fastening machines is the high torque per dimension and inherent low-speed capability of motor 70. In addition, motor 70 being brushless eliminates the brush and commutator replacement requirements associated with other motors such as d.c. servomotors. Since motor housing 78 serves no commutative function it can be made of materials such as aluminum which provide better heat dissipation, increasing the thermal rating and thermal time constant of motor 70, i.e. the length of time over which it can handle peak loads without overheating. High torque and low speed controllability of motor 70 result from a high pole count, for example twelve poles in motor 70. High maximum speed of motor 70 is provided by using a very high voltage, for example 300 volts d.c., at the motor bus, such high voltage being accommodated at the bus by the brushless feature of motor 70 which provides no loci for internal arcing.

The brushless, synchronous a.c. servomotor 70 has a relatively high maximum to minimum speed ratio of about 30:1. While some d..c variable speed motors perhaps could provide such a ratio, they have problems associated with the motor brushes, brush springs, commutator, solids contamination on the brush assemblies and other maintenance problems. Induction motors generally are of the fixed speed, constant torque type, and a split phase induction motor typically has a max./min. speed ratio of only about 3:1. Motor 70 also accommodates the cycling requirements and variable duty cycle of automatic fastening machines. For example, the complete cycle of the riveting machine shown in FIG. 1 including drilling one hole and inserting and upsetting one rivet, is about two seconds. This cycling requirement of about thirty times per minute is accommodated in a satisfactory manner by motor 70. The motor also is compatible with variable duty cycle requirements wherein the drill is to be on and off for different time intervals.

Figure 7:
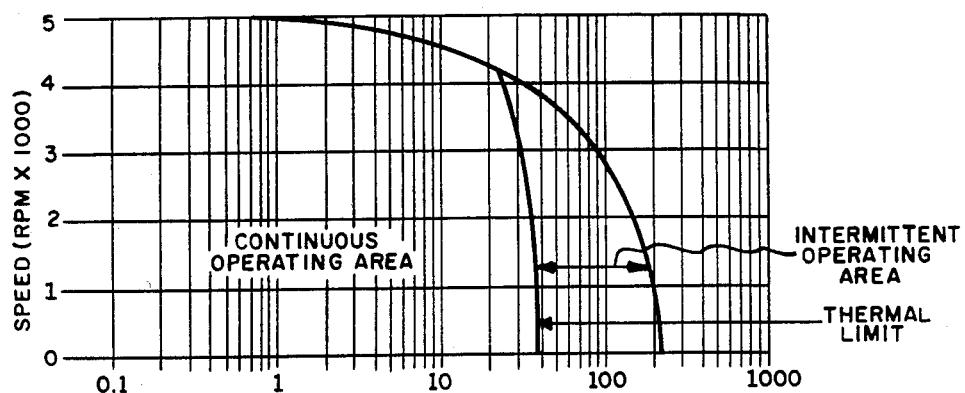
FIG. 7 is a graph including torque-speed curves for the motor in the drill spindle drive of the present invention.
Figure 5:
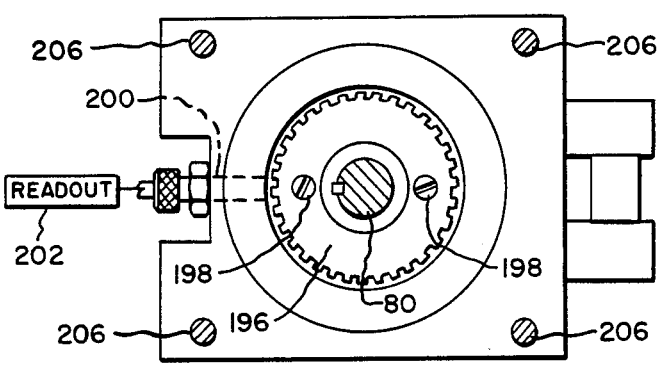
FIG. 5 is a sectional view taken about on line 5—5 in FIG. 4.

The extremely efficient operation and high torque to weight and size ratio of motor 70 are illustrated further by the graph of FIG. 7 which presents a typical torque-speed curve for the motor. The curve includes three sections 100, 102 and 104. Sections 100 and 102 define the continuous operating range, the range defined by section 102 being determined by a thermal limit associated with the motor winding temperature. For example, in the motor from which the data for FIG. 7 was derived, the thermal limit is a winding temperature of 155° C. (40° C. ambient, 115° C. rise). Section 104 defines an intermittent load operating range. The intermittent operating area between curve sections 102 and 104 is determined by an initial winding temperature of 100° C., one second rating. From the curve of FIG. 7, it is seen that at the higher r.p.m.s, typically used for drilling the lower tensile non-ferrous materials, the torque range is quite adequate even in the continuous load range. Since automatic fastening calls for intermittent loads it is seen from FIG. 7 that torque increases dramatically in the intermittent operating area. At the lower speeds of approximately 2000 r.p.m. and below, intermittent loads permit torque of 200 lbs.-in. This is ideal for materials such as titanium, composites, PH steels and the like.

A brushless synchronous a.c. servomotor which performs satisfactorily in an automatic drilling and riveting machine of the type shown in FIG. 1 is commercially available from Moog Inc., East Aurora, N.Y. under model number 304-008 which has the following specification: continuous stall torque 41 lb.-in., peak stall torque 210 lb.-in., constant no load speed 5000 r.p.m., torque constant 4.9 lb.-in./A, voltage constant 58.3 volts/krpm, mechanical time constant 1.38 ms., electrical time constant 2.62 ms., resistance 1.50 ohms at 25° C., continuous stall current 9.9 amperes, peak stall current 42.7 amperes, inertia without brake $2.5 \times 10^{-3}$ lb.-in.-sec$^2$ and weight without brake of 10.0 lbs. The motor has an integral resolver with the following specifications: input voltage 6.0 volts a.c., input frequency 1000 Hz, maxium input current 15.0 m.a., transformation ratio 0.45:1 and output voltage 2.72 volts a.c. The motor has twelve poles, employs rare earth magnets and has a rotor external to the core which further improves heat dissipation while improving the torque-to-inertia ratio. The higher torque/inertia ratio and higher acceleration provide faster response and reduced cycle time. The longer thermal time constant increases the usefulness of peak operating capacity providing more durable, reliable equipment. The high thermal capacity coupled with the high energy rare earth magnets provide high peak torque capability for demanding duty cycles.

Figure 8:
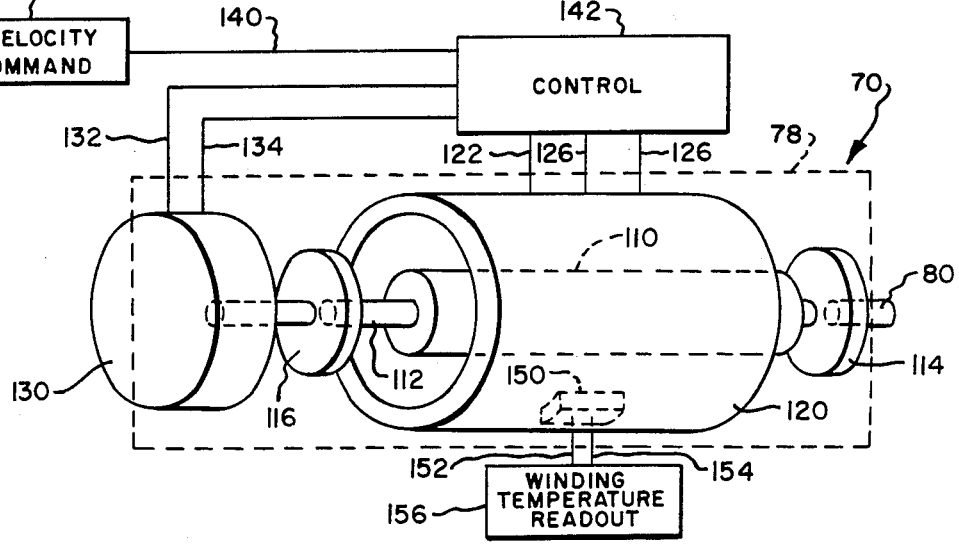
FIG. 8 is a diagrammatic view of the motor in the drill spindle drive according to the present invention.

FIG. 8 is a diagrammatic view further illustrating the brushless synchronous a.c. servomotor 70. It includes a rotor 110 having output shaft 80 extending from one end and an internal motor shaft 112 extending from the opposite end. Rotor 110 is rotatably mounted in motor housing 78 by suitable means, for example bearings 114 and 116 in which shafts 80 and 112, respectively are journalled. Rotor 110 is located within the motor winding 120 which, in the present illustration, is represented by the hollow cylindral structure in FIG. 8. In the illustrative Moog model 304-008 brushless motor identified hereinabove, there are three windings connected in a three phase wye corfiguration, and therefore the three conductors 122, 124, and 126 shown in FIG. 8 represent the lines for energizing the respective windings. Motor 70 also includes an integral resolver 130 connected to shaft 112 for providing signals on lines 132, 134 containing information as to the position of rotor 110. A velocity or speed command signal from source 138, which can be potentiometer mounted at a convenient location on the machine frame 12, is applied by line 140 to one imput of a control 142. The signals on lines 132, 134 are applied to other inputs of control 142. Control 142 is a servo or feedback control which compares actual speed of rotor 110 through information from the signals on lines 132, 134 to the desired speed of rotor 110 represented by the signal on line 140 to develop output signals which are applied by lines 122, 124, 126 to the motor windings to vary the speed of rotor 110. For use with the Moog model 304-008 brushless motor identified above, control 142 can be Moog pulse width modulation controller of the analog type, model no. 152-0001. The power supply can be Moog model 150-101.

In accordance with the present invention, there is provided heat sensor means 150 embedded in winding 120 and operatively connected by lines 152, 154 to readout means 156 for providing an indication of motor winding temperature. Readout means 156 can provide a visual display of temperature and be located conveniently on machine frame 12. The advantage of sensor 150 in the motor winding is to provide a more accurate and true indication of motor winding and rotor temperature than is available from measuring the temperature of motor housing 78. An alarm can be associated with readout means 156 to signal when the motor is approaching its maximum temperature, for example the alarm can be set for about 220° F. By way of example, heat sensor 150 is an NTC thermistor commercially available from Sensor Scientific under model no. F505S43A133-20. Alternatively, heat sensor 150 can be a thermocouple or heat sensing switch or pyrometer.

In accordance with the present invention, fan means 74 on machine frame 12 is provided to direct cooling air onto motor 70 during operation of machine 10. Fan 74 provides a forced air cooling system which advantageously improves the peak handling characteristics and increases the life of motor 70. For example, it has been determined that without fan 74 the motor winding and core temperature can approach 240° F. and with fan 74 the motor winding and core temperature is reduced to about 100° F. As shown in FIG. 1, fan 74 is mounted on the upper portion of frame 12 by a bracket 158 so as to be in substantial horizontal alignment with motor 70 in the position shown in FIG. 1. By way of example, fan 74 can be a 1/10 horsepower blower commonly available from Grainger under model no. 4C442.

Machine 10 of the present invention with brushless electric motor drill spindle drive has the capability of handling a wide variety of drilling applications. A typical use is in riveting aluminum aircraft panels onto stringers. Titanium drilling in automatic fastening machine applications is more challenging. It involves very slow drill feed rates, i.e. two inches per minute, at low drill speeds, i.e. 100–200 r.p.m., and extremely high peak torques. The illustrative motor 70 and control 142 identified above provides smooth operation at 200 r.p.m. A one-quarter inch titanium coupon was drilled with ease by machine 10 of the present invention. Drill speed was observed to drop only about 9% below set speed on contact with the titanium workpiece and was observed to recover quickly. Hole quality was observed to be excellent, indicating that available torque was always sufficient to prevent stalling. Titanium drilling capability of this order had previously been available only on large riveting machines with costly low speed hydraulic servo packages.

Figure 6:
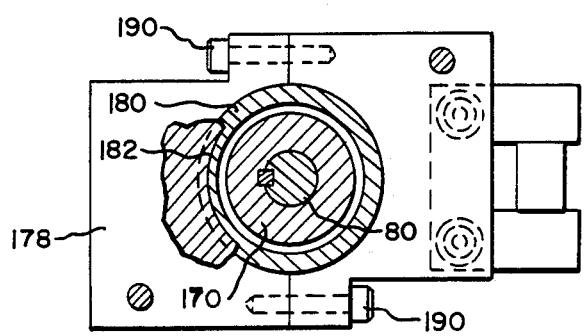
FIG. 6 is a sectional view taken about on line 6—6 in FIG. 4.

Referring now to FIG. 4, motor 70 is connected to drill spindle 86 and positioned on drill ram 68 in the following manner. Drill ram 68 is movably mounted in a cylinder block 160 and drill spindle 86 is rotatably mounted in ram 68 by bearings 162, 164. A drill 166 is held in a collet and collet nut assembly 168 at the lower end of spindle 86. Motor output shaft 80 is pinned or otherwise fixed in one end of a locknut 170, the opposite end of which is threaded onto the upper end of spindle 86 against a lockwasher 172 adjacent bearing 162. Motor housing 78 is interfaced with drill ram 68 by the combination of a motor mount 176 and a drill spindle clamp 178. Clamp 178 is fixed to ram 68 by firm engagement between an annular rim or flange 180 extending radially inwardly from a central through opening 182 in clamp 178 and an annular groove 184 in the outer surface of ram 68. Rim 180 and groove 184 fit together firmly and tightly in a manner maintaining precise perpendicularity between the upper planar surface 186 of clamp 178 and the longitudinal axis of ram 68 and, hence, the axis of rotation of spindle 86. As shown in FIG. 6, clamp 178 is in two half sections separated for assembly onto ram 68 and fastened together by screws 190.

Motor mount 176 is supported on clamp 178 and has parallel upper and lower planar surfaces disposed precisely perpendicular with respect to the longitudinal axis of ram 68. Motor mount 176 includes an inner recess 194 to accommodate a tachometer gear 196 fixed to the end of locknut 170 by screws 198. Gear 196 is of magnetic material and a magnetic pickup device 200 is fixed in motor mount 176 in radial alignment with gear 196. Pickup 200 is connected to a tachometer readout device 202 located on frame 12 for convenient viewing by operating personnel for monitoring drill spindle speed.

The planar surface 82 of motor of motor housing 78 abuts the planar upper surface of motor mount 176. Motor housing 78, motor mount 176 and drill spindle clamp 178 are firmly fixed together by fasteners 206. Motor housing surface 82 is precisely perpendicular to the axis of rotation of motor shaft 80. The foregoing arrangement, particularly the provision of drill spindle clamp 176 and positive and firm engagement between rim 180 and groove 184, maintains a very exact degree of perpendicularity between motor housing surface 82 and the axis of rotation of drill spindle 86, for example within 0.001 inch for precise drilling. In other words, the foregoing arrangement maintains precise coincidence between the axes of rotation of motor output shaft 80 and drill spindle 86.

As shown in FIG. 4, motor housing 78 is provided with connector structures 210 and 212 for the winding and resolver conductors, respectively. The extent of downward travel of drill ram 68 is adjustably limited by engagement between an index nut 216 threaded on ram 68 near clamp 178 and a spacer 220 supported on a throat bushing 222 supported by the cylinder block 160. Turning of index nut 216 upon loosening of set screw 226 adjusts this limit. The upward limit of travel is determined by engagement between shoulder 230 on ram 68 and throat bushing 222. An anti-rotation post 232 is bolted to the drill spindle assembly and slides through an anti-rotation bracket 234 to maintain radial alignment of the drill spindle assembly during the feed/retract stroke of ram 68.

When drill feed is required, hydraulic pressure is admitted to the chamber defined between ram shoulder 230 and the lower surface of throat bushing 222 and within cylinder block 160. This pressure drives drill ram 68 downward within cylinder block 160. When drill retraction is called for, pressurized hydraulic oil is admitted to a chamber 240 immediately above lower bushing 242 which reverses drill ram travel. The flow of hydraulic fluid to and from the respective chambers is through the arrangement of conduits designated 246 in FIG. 4.

The drill spindle cylinder block 160 is fixed to a transfer slide 250 which is supported by a plurality of cam followers 252 secured to the inside surface of the upper head assembly 24. Toggle links 256 and 258 are pivoted upon an upper toggle pin 260 which is installed in cylinder block 160. Thus when the transfer cylinder rod eye 262 moves forward, the transfer slide 250 is moved forward on the cam followers.

The center toggle link is connected at 264 to an anvil holder ram 266. The ram 266 slides down vertically in a notch in a cylinder body, while being guided by ram gibs. Two transfer cam tracks 270, 272 (FIG. 3) are secured to the right and left insides of the upper head and each has an inverted, slightly rounded L-shaped track.

Figure 2:
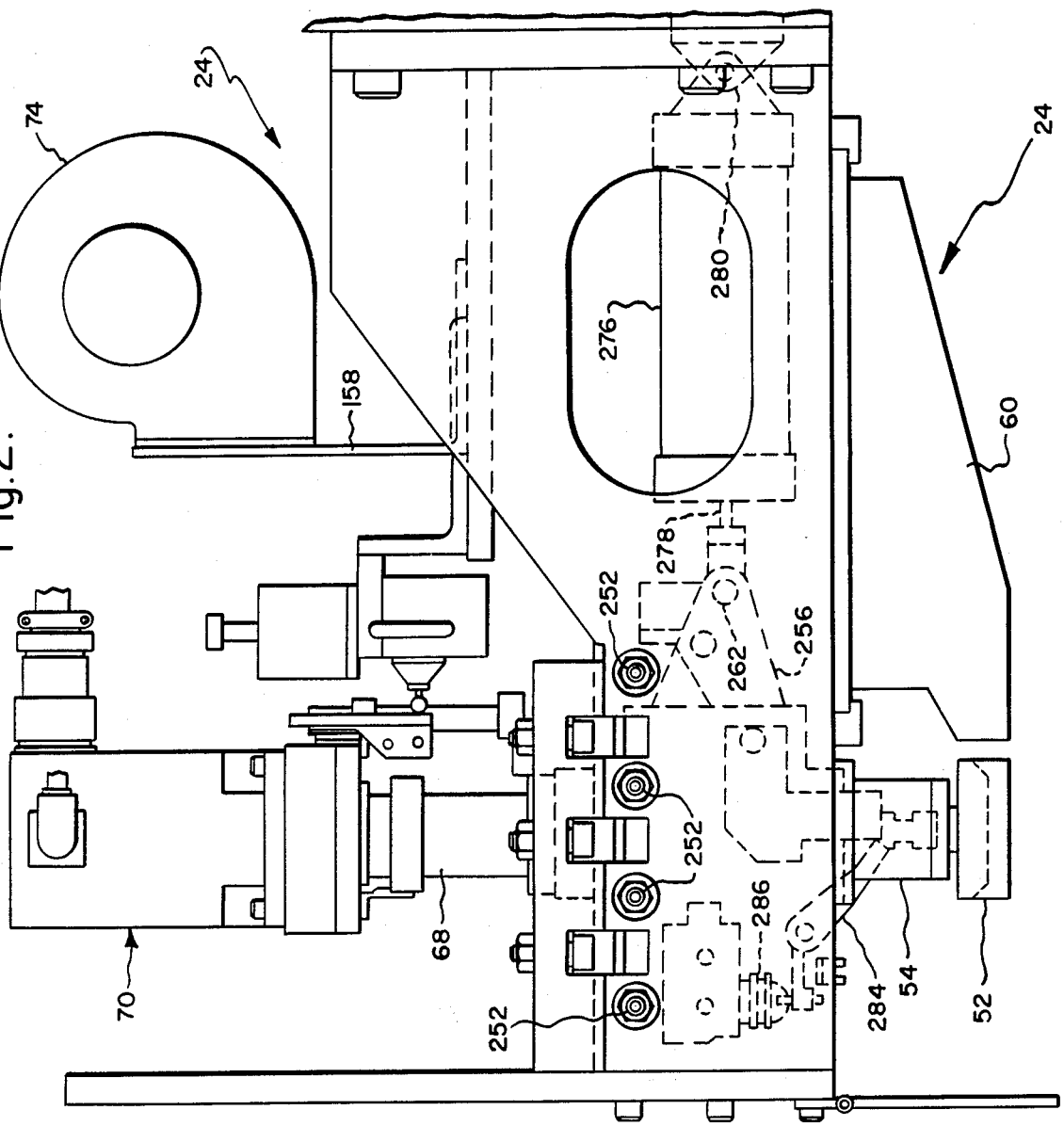
FIG. 2 is an enlarged, side elevational view of the upperhead installation of the machine of FIG. 1.

When the pneumatic transfer cylinder 276 (FIG. 2) is pressurized, the transfer slide 250 is driven forward; the push of the lower toggle link 256 is maintained in the horizontal line by the cam followers riding in the horizontal portion of the transfer cam tracks 270, 272. As the downward arc of the cam tracks is entered, the lower toggle link commences to rotate downward. The ram 266 starts to decend and the horizontal forward motion of the transfer slide begins to slow. When the lower toggle link and cam followers have negotiated the 90 degrees of arc of the cam tracks, any further transfer slide motion is locked out and the motion of the toggles 256, 258 is entirely that of driving ram 266 downward. The transfer cylinder 276 is pivoted at mounting plate 280 so as to allow for the downward rotation of the cylinder axis during transfer. The transfer cylinder piston reaches the end of its stroke as the lower toggle link operates a rivet forward limit switch arm 284 to actuate a rivet forward limit switch 286. This action clears the way for upset pressure to be applied from below the workpiece. Upon completion of the underside stroke cycle, the necessary commands are initiated and the transfer cylinder piston is retracted which retracts ram 266 and returns the transfer slide 250 to the drill position with the drill centered over the finished rivet.

To summarize a basic machine cycle operation, when workpiece 16 has been properly positioned and a machine cycle is initiated by appropriate controls, pressure foot 50 lowers and the lower ram hydraulic cylinder 40 forces the clamp cylinder 42 and head assembly to rise. This clamps workpiece 16 firmly between the pressure sleeve of lower anvil 28 and the underside of the bushing on pressure foot 50. The clamped condition of workpiece 16 is signalled to initiate the drilling cycle. Drill spindle 86 is rotated by motor 70 and drill ram is moved downward to drill the workpiece 16 and then retracted as previously described. During the drilling cycle a rivet is removed from hopper 60 and placed in rivet fingers associated with upper anvil 300.

Completion of drill spindle retraction initiates transfer of the upper head 24 to position the upper ram 266 over the work centerline, i.e. the drilling and riveting axis. The pneumatic transfer cylinder 276 in upper head assembly 24 is energized, forcing the transfer slide 250 mounting the working components of the upper head installation 24 forward for rivet insertion and bucking operation.

As previously mentioned, at the initiation of drill spindle descent, a rivet is inserted into holding fingers beneath the upper anvil 300. The upper head transfer cylinder 276 positions upper ram 266 over the work centerline upon completion of the drill operation. As ram 266 is downstroked, the fingers are separated by the downward motion of upper anvil 300, which then inserts therivet into the predrilled hole in workpiece 16 and bucks the upper head of the rivet in preparation for upsetting pressure from lower ram 40. Rivet upset then is performed by actuating the lower ram hydraulic cylinder 38 forcing the lower anvile 28 to rise and upset the rivet.

Upon rivet upset, the lower ram 40 descends to its working stroke height, the transfer cylinder 276 returns transfer slide 250 to its original position with drill spindle 86 centered over the finished rivet, i.e. work centerline. The machine cycle is complete and the workpiece 16 then is repositioned for the next machine cycle.

The forgoing description is of an illustrative automatic drilling and riveting machine to which the present invention is applicable. The present invention is readily applicable to other types of automatic fastening machines, for example those shown and described in U.S. Pat. Nos. 3,354,896 issued Oct. 20, 1970 entitled "Riveting Machine" and 4,515,302 issued May 7, 1985 entitled "Riveting Machine", the disclosure of each of which is hereby incorporated by reference.

It is therefore apparent that the present invention accomplishes its intended objects. While an embodiment of the present invention has been described in detail, that is for the purpose of illustration, not limitation.

We claim:

1. In automatic fastening machine comprising a frame, drilling means carried by said frame for drilling a fastener receiving hole in a workpiece and means carried by said frame for installing a fastener in the hole drilled in said workpiece, said drilling means comprising a drill spindle having an axis of rotation and a drilling tool at one end thereof and rotatably mounted in a ram movable on said machine frame toward and away from the workpiece, the improvement comprising;
   (a) a brushless synchronous a.c. servomotor including an output shaft having an axis of rotation, said motor having a torque range from about 40 lb.-in. to at least about 60 lb.-in., a speed range of from about 200 r.p.m. to at least about 5000 r.p.m., a low profile and small size and maximum weight of about 10 pounds and a cycling capability of about 30 times per minute; and
   (b) means for connecting said motor directly to said drill spindle with the axis of rotation of said motor shaft coincident with the axis of rotation of said drill spindle.

2. An improved automatic fastening machine according to claim 1 further including forced air fan means on said frame and positioned to direct cooling air onto said motor during operation thereof.

3. An improved automatic fastening machine according to claim 1, wherein said motor comprises windings surrounding a rotor and further including
   (a) heat sensor means embedded in said motor windings; and
   (b) readout means operatively connected to said heat sensor means for providing an indication of motor winding temperature.

4. An improved automatic fastening machine according to claim 1, wherein said motor includes a housing having a surface from which said output shaft extends with the axis of rotation of said shaft being perpendicular to the plane of said housing surface and wherein said connecting means includes drill spindle clamp means between said motor and said drill ram for maintaining perpendicularity between said plane of said motor housing surface and the axis of rotation of said drill spindle.

5. An improved automatic fastening machine according to claim 4, wherein said drill spindle clamp has a central opening embracing said drill ram and having an end surface operatively contacting said motor housing surface, said ram having an annular groove provided in the outer surface thereof and said clamp having an annular rim on the inner surface of said opening firmly and tightly fitted in said annular groove of said ram.

6. An improved automatic fastening machine according to claim 1, further including:
   (a) tachometer means operatively associated with said drill spindle; and
   (b) readout means operatively connected to said tachometer means for providing an indication of drill spindle rotational speed.

7. An improved automatic fastening machine according to claim 1 further including control means operatively connected to said motor for controlling the speed of said motor in response to an input speed command.

8. In an automatic fastening machine comprising a frame, drilling means carried by said frame for drilling a fastener receiving hole in a workpiece and means carried by said frame for installing a fastener in the hole drilled in said workpiece, said drilling means comprising a drill spindle having an axis of rotation and a drilling tool at one end thereof and rotatably mounted in a ram movable on said machine frame toward and away from the workpiece, the improvement comprising:

(a) a brushless synchronous a.c. servomotor including an output shaft having an axis of rotation, said motor providing high torque per weight and size thereof and having low speed controllability;
(b) means for connecting said motor directly to said drill spindle with the axis of rotation of said motor shaft coincident with the axis of rotation of said drill spindle;
(c) forced air fan means on said frame separate from said motor and positioned to direct cooling air onto said motor during operation thereof;
(d) heat sensor means embedded in the motor winding; and
(e) readout means operatively connected to said heat sensor means for providing an indication of motor winding temperature.

9. An improved automatic fastening machine according to claim 8 further including means for applying a very high voltage of about 300 volts d.c. to the bus of said motor.

10. An improved automatic fastening machine according to claim 8, wherein said motor has a maximum to minimum speed ratio of about 30:1 and a cycling capability of about 30 times per minute.

11. In an automatic fastening machine comprising a frame, drilling means carried by said frame for drilling a fastener receiving hole in a workpiece and means carried by said frame for installing a fastener in the hole drilled in said workpiece, said drilling means comprising a drill spindle having an axis of rotation and a drilling tool at one end thereof and rotatably mounted in a ram movable on said machine frame toward and away from the workpiece, the improvement comprising:
(a) a brushless synchronous a.c. servomotor including an output shaft having an axis of rotation, said motor having a continuous stall torque of about 41 lb.-in., constant no load speed of about 5000 r.p.m., torque constant of about 4.9 lb.-in/A, voltage constant of about 58.3 volts/krpm, mechanical time constant of about 1.38 ms., electrical time constant of about 2.62 ms., resistance of about 1.50 ohmns at 25° C., continuous stall current of about 9.9 amperes, peak stall current of about 42.7 amperes, inertia without brake of about $2.5 \times 10^{-3}$ lb.-in.-sec$^2$ and weight of about 10 pounds; and
(b) means for connecting said motor directly to said drill spindle with the axis of rotation of said motor shaft coincident with the axis of rotation of said drill spindle.

12. An improved automatic fastening machine according to claim 11, further including fan means on said frame and positioned to direct cooling air onto said motor during operation thereof.

13. An improved automatic fastening machine according to claim 11, wherein said motor comprises windings surrounding a rotor and further including
(a) heat sensor means embedded in said motor windings; and
(b) readout means operatively connected to said heat sensor means for providing an indication of motor winding temperature.

14. An improved automatic fastening machine according to claim 11, further including:
(a) tachometer means operatively associated with said drill spindle; and
(b) readout means operatively connected to said tachometer means for providing an indication of drill spindle rotational speed.

* * * * *